UNITED STATES PATENT OFFICE.

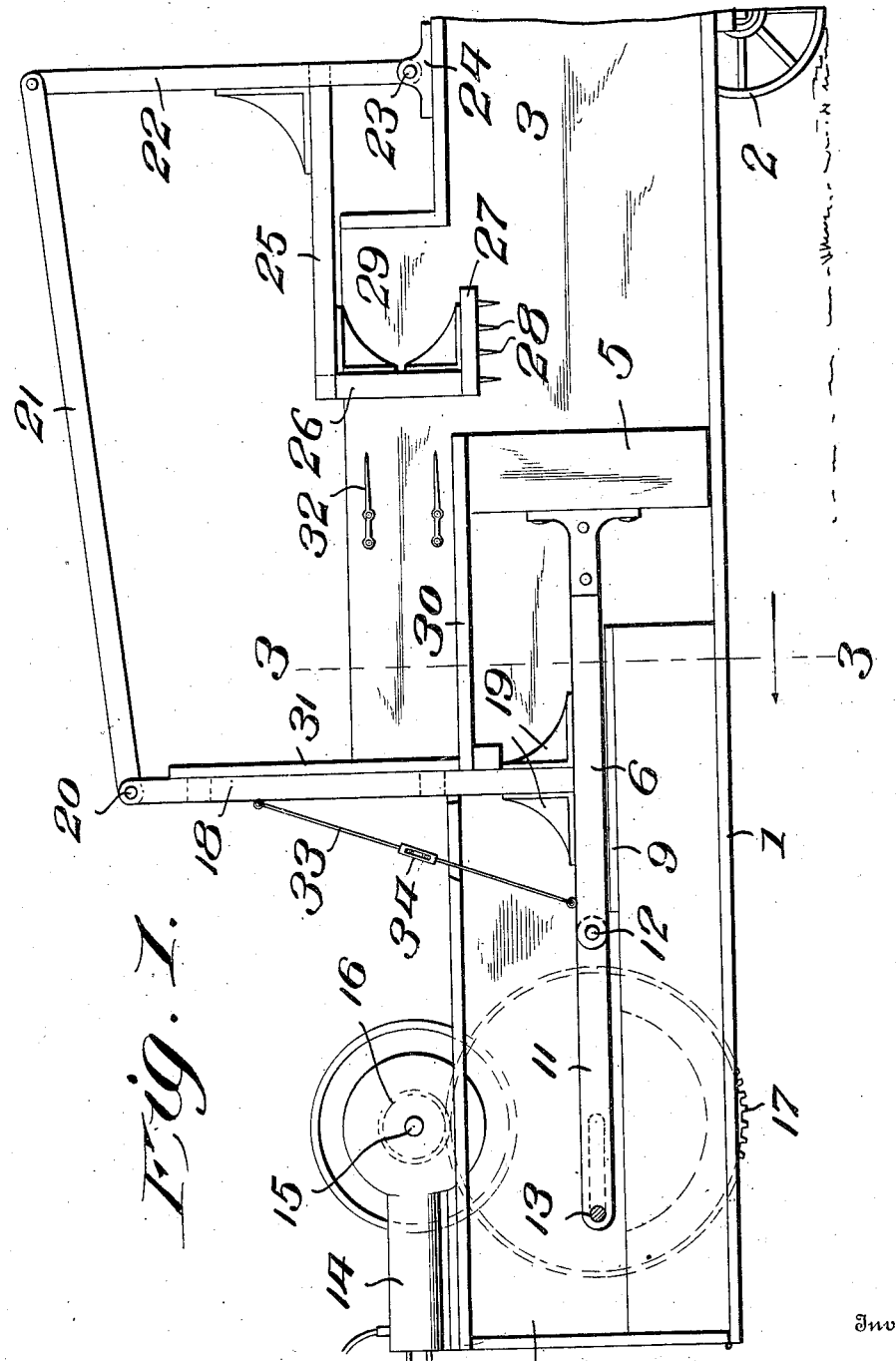

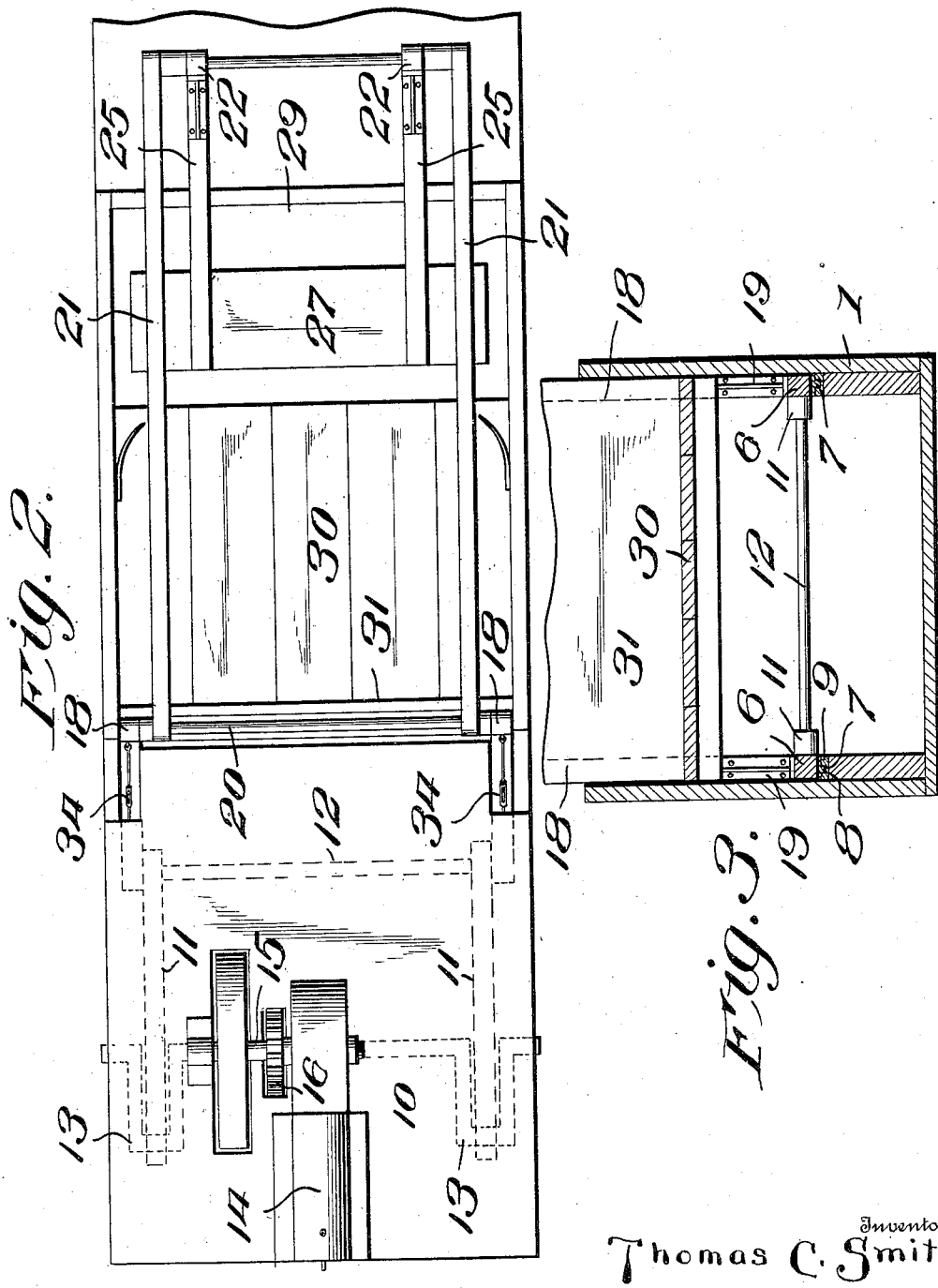

THOMAS C. SMITH, OF JACKSON, TENNESSEE.

HAY-PRESS.

No. 861,483.　　　Specification of Letters Patent.　　　Patented July 30, 1907.

Application filed October 4, 1906. Serial No. 337,387.

*To all whom it may concern:*

Be it known that I, THOMAS C. SMITH, a citizen of the United States, residing at Jackson, in the county of Madison and State of Tennessee, have invented certain new and useful Improvements in Hay-Presses; and I do hereby declare the following to be a full, clear, and exact description of the invention, such as will enable others skilled in the art to which it appertains to make and use the same.

My invention relates to presses and more particularly to that class adapted to be used in baling straw, hay, and the like, and my object is to provide a device of this class which can be operated by any suitable form of engine and one wherein the hay will be fed into the baling chamber automatically.

A further object is to provide means for disposing the hay into position to be fed into the baling chamber.

Other objects and advantages will be hereinafter referred to and more particularly pointed out in the claims.

In the accompanying drawings which are made a part of this application, Figure 1 is a side elevation of the press showing one wall thereof removed. Fig. 2 is a top plan view thereof, and, Fig. 3 is a sectional view as seen from line 3—3 Fig. 1.

Referring to the drawings in which similar reference numerals desginate corresponding parts throughout the several views, 1 indicates the frame of my improved baling press which is preferably mounted upon suitable carrying wheels 2. One end of the frame is provided with a baling chamber 3, while the opposite end thereof is provided with a chamber 4 in which is located my improved operating mechanism.

Disposed within the chamber 4 and adapted to enter the baling chamber 3 is a plunger 5, to one side of which are secured operating beams 6, said beams being provided on their lower edges with tongues 7 which are adapted to enter channels 8 in bearing blocks 9. The operating beams 6 are secured to a crank shaft 10 by means of beams 11, said beams being pivotally secured at one end to the operating beams 6, by disposing a bar 12 through the beams 11 and operating beam 6 while the opposite ends of said beams are secured to the crank portions 13 of the shaft 10 so that when the crank shaft 10 is rotated the plunger 5 will be reciprocated to compress the hay into the baling chamber.

In order to conveniently drive the crank shaft 10 I have disposed upon the upper surface of the frame 1 any suitable form of engine 14, which is provided with a driving shaft 15 upon which is located a pinion 16. The pinion 16 is adapted to mesh with a driving gear 17 mounted upon the shaft 10 so that when the engine is operated the shaft 15 will be rotated and through the medium of the pinion 16 and driving gear 17 the crank shaft 10 will likewise be rotated thereby operating the plunger 5.

Disposed upon the operating beam 6 and adapted to travel therewith are standards 18, the lower ends of which are rigidly secured to the beams 6 by means of brackets 19 while the upper ends thereof are connected together by means of a crossbar 20 to which are pivotally secured arms 21 while the opposite ends of said arms are pivotally secured to rocking arms 22, which are in turn pivotally secured at their lower ends to a bar 23 mounted in suitable bearings 24, carried by the upper surface of the frame 1. Rigidly secured to the rocking arms 22 and extending at right angles thereto are beams 25 to the outer ends of which are secured depending beams 26 which have secured to their extreme lower end a depression head 27 on the lower surface of which are disposed a plurality of spikes 28.

The head 27 is adapted to be intermittently disposed into the mouth of the hopper 29 to direct the straw into the path of the plunger 5 and it will be seen that by providing the standards 18 to the arms 21 and rocking arms 22 that when the plunger is directed into the baling chamber the depression head 27 will be elevated out of the mouth of the hopper so that a new supply of straw can be disposed in the hopper.

It has been the practice heretofore to deposit straw directly into the hopper of the machine but it is my desire to provide means for depositing the straw upon certain parts of the machine the operation of which will direct the straw into the hopper and to this end I have provided a platform 30, one end of which rests upon the plunger 5 while the opposite end thereof is secured to the standards 18 and to prevent the straw from passing between the standards 18, I have provided a wall 31 which is held in a vertical position along one face of the standards 18 in any preferred manner.

It will now be seen that by depositing the straw upon the platform 30 that as the plunger moves towards the baling chamber the straw will be carried therewith and into engagement with fingers 32 secured to the walls of the hopper so that when the plunger 5 makes its return stroke the straw will be engaged by the fingers and held within the hopper so that when the depression head 27 descends the straw will be forced into the path of the plunger. To relieve the standards 18 from any undue strain as when the depression head encounters an unusual amount of straw, I have provided a brace-rod 33, one end of which is secured to the standards 18 near their upper ends while the lower ends of the brace-rod is secured to the operating beam 6, the brace-rod being preferably formed in two sections and secured together by means of a turn buckle 34 so that the tension of the brace-rod may be regulated from time to time.

In operation a quantity of hay or straw is placed upon the platform 30 and as the plunger makes its forward stroke, the depression head 27 is elevated and the straw carried into the hopper 29 and held in this position by means of the fingers 32 and as the plunger 5 makes its return stroke the depression head 27 is again lowered and the straw forced into the path of the plunger, and it will be seen that by depositing the straw upon the platform and between the wall 31 and the side walls of the hopper that the straw will be in a compact bunch so that when engaged by the depression head the entire bunch of straw will be deposited into the path of the plunger without leaving particles thereof hanging to the edge of the hopper.

It will now be seen that I have provided a device of this class which can be readily and cheaply constructed and one that will be positive in its operation and while I have shown the same as operated by an engine it will be understood that the same may be operated in any preferred manner.

It will also be seen that by placing the driving power upon the press frame and mounting the press upon trucks, that the press can be driven through the field and the hay baled from the windrow and the press can also be used for baling straw as it comes from the threshing machine as the platform 30 is of sufficient dimensions to readily catch the straw as it is discharged from the mouth of the straw carrier, the action of the automatic feeding mechanism for the press being of sufficient rapidity to clear the platform of the straw as fast as it is deposited thereon.

What I claim is:

1. In a press of the class described, the combination with a body having a baling chamber in one end thereof and a hopper on the upper surface of said frame; of a plunger adapted to enter said baling chamber, operating beams secured to said plunger, standards on said operating beams and adapted to travel therewith, rocking arms pivotally secured to said body, arms disposed between said rocking arms and standards, beams on said rocking arms, a depression head on said beams, a platform above said plunger and means on the walls of said hopper to engage straw carried by the platform and retain the same in the path of said depression head.

2. In a press of the class described, the combination with a frame having chambers therein; of a plunger adapted to travel in said chambers, a hopper on said frame and communicating with one of said chambers, a platform having a vertical wall at its rear end above said plunger and adapted to travel therewith, fingers secured to the walls of said hopper adapted to engage straw carried by said platform and retain the same in said hopper and means to operate said plunger.

3. In a press of the class described the combination with a body having chambers therein and a hopper communicating with said chambers, of a plunger, a platform having a vertical wall at its rear end fixed to said plunger and adapted to travel therewith, inwardly directed fingers fixed to the walls of said hopper and above and normally at one end of said movable platform whereby when said platform is moved forwardly the material thereon will be engaged by said fingers and held against rearward movement with said platform.

In testimony whereof I have signed my name to this specification in the presence of two subscribing witnesses.

THOMAS C. SMITH.

Witnesses:
M. D. MERIWETHER,
W. G. PERRY.